United States Patent
Akl et al.

(10) Patent No.: US 12,474,303 B2
(45) Date of Patent: Nov. 18, 2025

(54) METHOD AND SYSTEM FOR DEFECT SENSING WITHIN A FUSION WELD

(71) Applicant: SAUDI ARABIAN OIL COMPANY, Dhahran (SA)

(72) Inventors: Hani Ragb Abdulhadi Akl, Dikirnis (EG); Jadaan Matar Al Anezi, Dammam (SA); Abdullah Mohammed Saleh Al Khalifah, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 545 days.

(21) Appl. No.: 18/147,604

(22) Filed: Dec. 28, 2022

(65) Prior Publication Data

US 2024/0219349 A1 Jul. 4, 2024

(51) Int. Cl.
*G01N 29/04* (2006.01)
*G01N 29/24* (2006.01)
*G01N 29/28* (2006.01)
*G01N 33/2045* (2019.01)
*G01N 33/207* (2019.01)

(52) U.S. Cl.
CPC ......... *G01N 29/04* (2013.01); *G01N 29/2437* (2013.01); *G01N 29/28* (2013.01); *G01N 33/2045* (2019.01); *G01N 33/207* (2019.01); *G01N 2291/0234* (2013.01); *G01N 2291/0289* (2013.01); *G01N 2291/101* (2013.01); *G01N 2291/267* (2013.01)

(58) Field of Classification Search
CPC .... G01N 29/04; G01N 29/2437; G01N 29/28; G01N 33/2045; G01N 33/207; G01N 29/043; G01N 29/11; G01N 29/262; G01N 2291/0234; G01N 2291/267; G01N 2291/101; G01N 2291/0289
USPC .......................................................... 73/629
See application file for complete search history.

(56) References Cited

U.S. PATENT DOCUMENTS

| | | | | |
|---|---|---|---|---|
| 4,299,128 A * | 11/1981 | Gruber | .................. | G01N 29/11 73/627 |
| 5,963,882 A * | 10/1999 | Viertl | ..................... | G01N 29/34 73/609 |
| 8,046,178 B2 * | 10/2011 | Dai | ...................... | B23K 9/0956 702/36 |
| 10,551,351 B1 * | 2/2020 | Davis | .................. | G01N 29/043 |
| 11,131,652 B2 * | 9/2021 | Ushijima | ............. | G01N 29/043 |

* cited by examiner

*Primary Examiner* — Jacques M Saint Surin
(74) *Attorney, Agent, or Firm* — Osha Bergman Watanabe & Burton LLP

(57) ABSTRACT

A system for detecting, in an examination, at least one defect in a target area of an article using a controller with a processor, an oscillator, a display, and an amplifier. The controller generates sonic pulses and receives pulse reflections. The system includes a sonic probe with an array of pulse transmitting-receiving elements that fires the sonic pulses and receives the pulse reflections. The system includes a couplant applied between the sonic probe and a test surface of the article. The couplant conducts the sonic pulses between the sonic probe and the article. The sonic pulses detect defects in the target area of the article. The sonic pulses are transmitted by the sonic probe into the target area, reflected off of the defect, returned to the sonic probe, received by the pulse transmitting-receiving elements, and are transmitted to the controller.

20 Claims, 8 Drawing Sheets

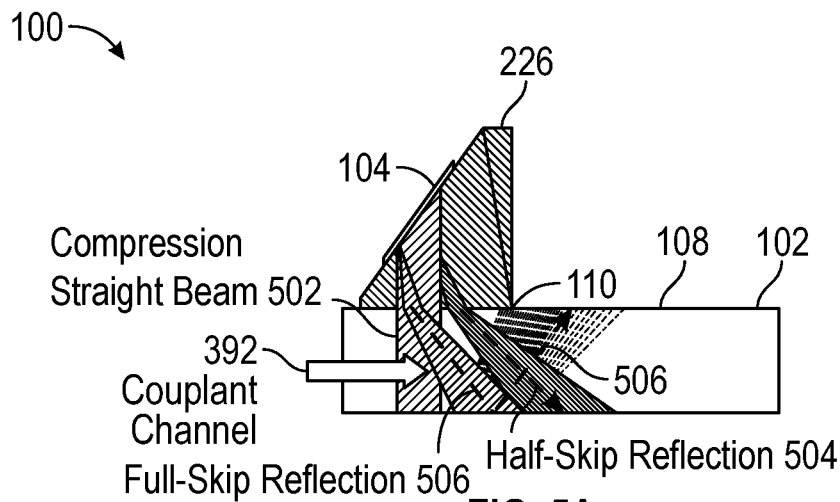
FIG. 5A
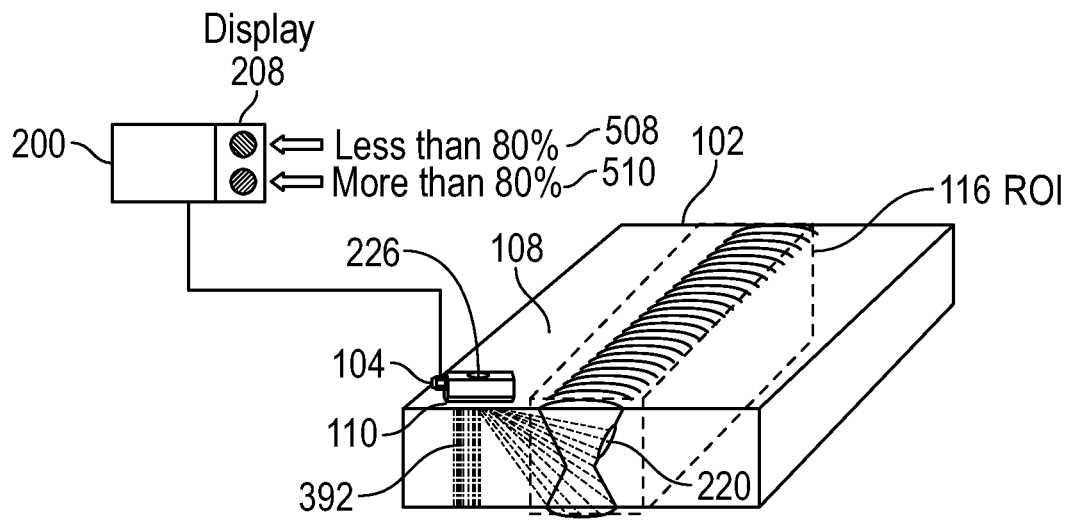
FIG. 5B
|  | Full skip scan 1 | Half skip scan 1 | Full skip scan 2 | Half skip scan 2 | Full skip scan 3 | Half skip scan 3 |
|---|---|---|---|---|---|---|
| Defect 1 | 64FSH | 76FSH | 100FSH | 65FSH | 100FSH | 64FSH |
| Defect 2 | 83FSH | 55FSH | 100FSH | 57FSH | 100FSH | 49FSH |
| Defect 3 | 96FSH | 62FSH | 100FSH | 62FSH | 88FSH | 100FSH |
FIG. 5C

METHOD AND SYSTEM FOR DEFECT SENSING WITHIN A FUSION WELD

BACKGROUND

Phased array ultrasonic testing (PAUT) is an investigation tool that uses transit time and the sound attenuation of echo pulses in materials to detect the presence of and the dimensions of defects that reflect the pulses. PAUT is adaptable to many different types of materials with differing acoustic properties and geometries. PAUT can examine defects such as voids in materials and lack of fusion in welds.

The phased array probe uses oscillator elements to send and receive sound pulses into an examined article. The transmission of the sound pulses needs to be transferred from the probe to the article. The transmission of the sound pulses may be diminished at the transition interface from the probe to the article. Transmission of the sound pulses across the interface is assisted by a couplant. A couplant is a material that transmits the acoustic waves back and forth across the interface between the probe and an article to be examined. A couplant may be as simple as water or more specialized, such as a gel, oil, grease, adhesive, and other suitable materials. During the examination, the presence of the couplant is important because without integrity of the couplant, the results from the examination may not accurately reflect the condition of the material being examined and thus may impair verifying the reliability of the PAUT.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

This disclosure presents, in accordance with one or more embodiments systems for detecting, in an examination, at least one defect in a target area of an article using a controller with a processor, an oscillator, a display, and an amplifier. The controller generates sonic pulses and receives pulse reflections. The system includes a sonic probe with an array of pulse transmitting-receiving elements that fires the sonic pulses and receives the pulse reflections. The system includes a wiring harness connected between the sonic probe and the controller and that transmits the sonic pulses and the pulse reflections. The system includes a couplant applied between the sonic probe and a test surface of the article. The couplant conducts the sonic pulses between the sonic probe and the article. The sonic pulses detect defects in the target area of the article. The sonic pulses are transmitted by the sonic probe into the target area, reflected off of the defect, returned to the sonic probe, received by the pulse transmitting-receiving elements, and are transmitted to the controller.

This disclosure presents in accordance with one or more embodiments a method that includes examining, by performing a phased array examination using a phased array system, an article with a target area to be tested for at least one defect in the target area of the article. The method includes applying a couplant on a test surface of the article, placing a sonic probe on the couplant, commanding the phased array system to examine the article, and detecting the defect or defects using the phased array system. The method includes evaluating the defect and a defect location, diagnosing the defect, and determining an affect on a purpose of the article on the detection of the at least one defect.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIG. 5A, FIG. 5B, and FIG. 5C show examples in accordance with one or more embodiments.

DETAILED DESCRIPTION

Figure 1:
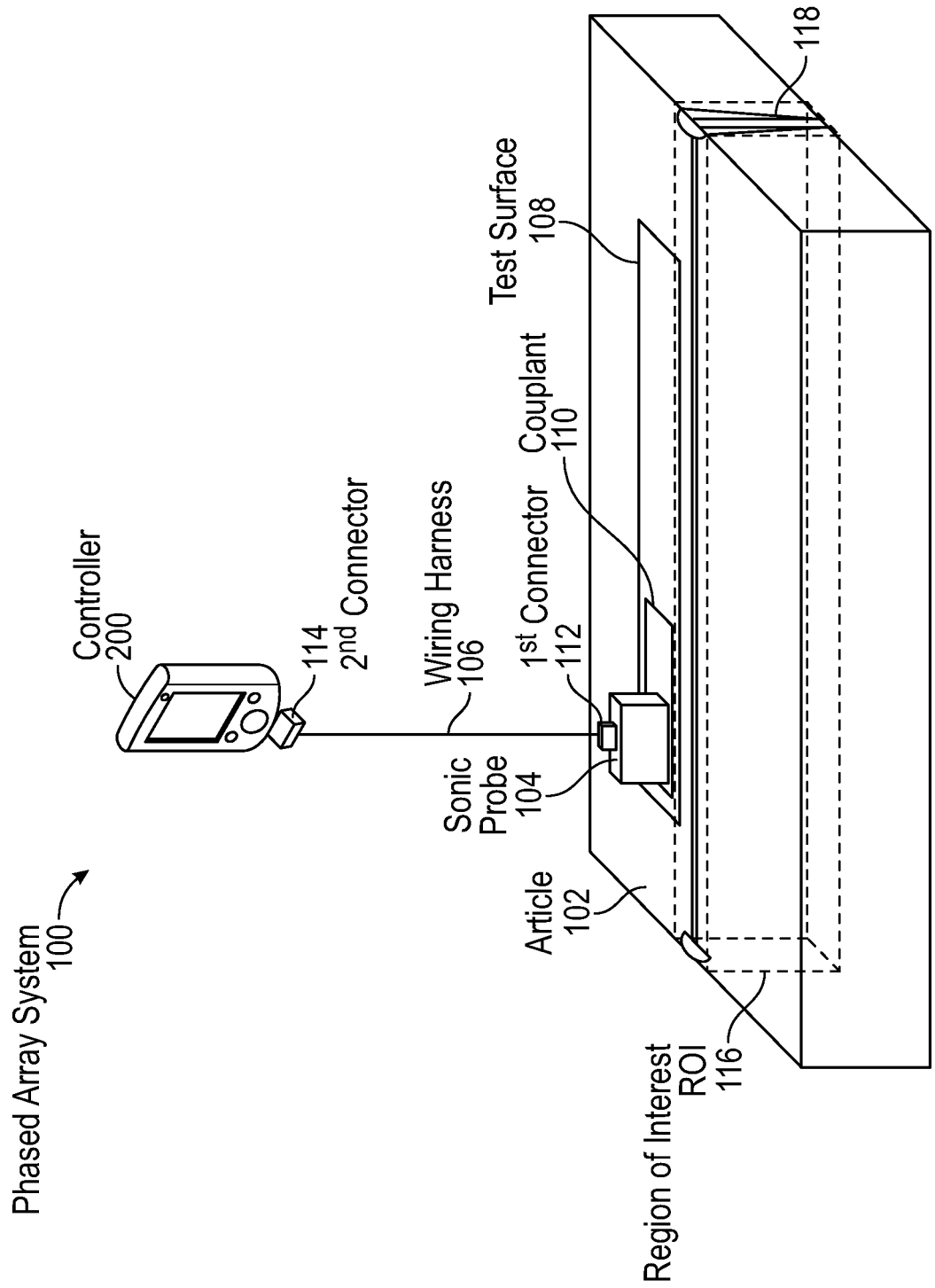
FIGS. 1, 2, 3, 4A, and 4B show systems in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments of the invention are directed to the presence and condition of a couplant between a Phased Array Ultrasonic Testing (PAUT) probe and the article being examined by PAUT. Monitoring and recording couplant operational parameters may facilitate and/or assist in verifying the reliability of PAUT during examinations. Monitoring and recording couplant operational parameters is important because without integrity of the couplant the results from the examination may not accurately reflect the condition of the material being examined. PAUT equipment may not be provided pre-configured for or otherwise equipped with an electronic pathway or couplant channel to show couplant operational parameters such as the presence, condition, and variation of the couplant. In accordance with one or more embodiments recording couplant operational parameters may produce an operational record. The operational record may provide an integrity status. The integrity status may result in an alarm such as those described below in FIG. 5.

More specifically, the disclosed phased array system is used on an article with a target area to be tested regarding a defect in the target area. The system, once it is provided to and set up on the article to be examined, is commanded to examine the article and at the end of the examination, may improve the probability of detection (POD) of defects and therefore contribute to verifying the reliability of the exam. Embodiments disclosed herein include systems and methods for establishing a pathway for electronic communication, or channel, dedicated to monitoring the integrity of the couplant, hereafter couplant channel, in the phased array system, developing the couplant channel using a sonic probe, and evaluating and detecting the defects in the article to be examined. In this embodiment the article to be examined is shown as a fusion welded steel component. The testing or evaluation may include the defect presence and defect dimensions. The testing or evaluation may include the defect location or position within the examined article relative to a reference location such as the sonic probe, the test surface, and/or a backwall of the article.

The disclosed phased array system may increase the POD in terms of detectability and evaluation of potential defects and may give an operator the full information about the quality of phased array inspection scanning. Embodiments disclosed herein may be considered an addition to the toolkit of quality measuring tools for phased array scanning. The disclosed phased array system adds a feature to manual phased array equipment. Applications of this disclosure may be used to enhance phased array systems for in-service and new fabrication inspection. Although the system and method are described as manual PAUT, the system and method may apply to any appropriate type of PAUT, such as, without limitation, automatic PAUT, automated PAUT, and/or any combination thereof.

A PAUT sonic probe may have many transducers. These small transducers may be computer controlled and may be pulsed independently in a set sequence or phase; the pulses of sound interfering with each other to produce a sound beam or wavefront of a certain angle. Sector inspection comprises steered beams, say 80 beams between 30° and 70° at ½-degree increments. Data along each beam line is recorded as an A-scan by the instrument and are processed to show on the display an examined sector within the article. Solid materials conduct sound waves. Interfaces such as edges and ends as well as internal flaws such as weld flaws reflect the sound waves. To detect flaws of a certain size, the wavelength is selected to be smaller than the flaw to ensure reflecting off of the flaw. Wavelength is related to frequency by the formula:

$$\lambda = \frac{c}{f},$$

where c=velocity of sound in km/s (kilometers per second), f=frequency in MHz (megahertz), λ=wavelength in mm (millimeters). The formula shows that the higher the frequency, the shorter the wavelength. The speed of sound in the material is the sound velocity, a material constant. For example, to detect a flaw in the millimeter magnitude, a frequency range of roughly 500 kHz (kilohertz) to 25 MHz may be used. Herein a sonic pulse is a short-duration high-intensity acoustic wave, i.e., a sound wave, characterized by a rapid rise in pressure followed by a rapid fall. The pressure may be caused by the transmission of sound energy. A couplant applied between the sonic probe and the article to be examined facilitates the transmission of the sound energy between the ultrasonic probe and the article. The purpose of the ultrasonic couplant is to get as much of the ultrasonic energy from the transducer into the test part, i.e., to get as much of the ultrasonic energy that is reflected by the flaw of the test surface back into the transducer. As such, an ultrasonic couplant to be qualified as good may optimize transmission of ultrasonic energy from the transducer into the article (such as a test part) and/or the reference block, and/or may optimize transmission of the ultrasonic energy that is reflected by the flaw of the article or reference block back into the transducer. Results may be considered acceptable when the amplitude of the couplant channel meets or exceeds 80% FSH. Results may be considered unacceptable when the amplitude of the couplant channel falls below 80% FSH. PAUT may require the examined article to be made of a material with a sound absorption greater than zero. Sound absorption is a function of surface impedance. The couplant may ensure surface impedance does not increase due to the contact interface between the probe and the article.

Absorption is defined as:

$$\alpha := 1 - \left| \frac{Z_s - \rho_0 c_0}{Z_s + \rho_0 c_0} \right| \pi r^2$$

Variable $Z_s$ is the "surface impedance of the material." Factor $\rho_0 c_0$ is the air characteristic impedance. Alpha ($\alpha$) is the absorption coefficient. Not absorbing sound at all means the absorption coefficient must be zero. Surfaces such as steel plate, plaster walls, and concrete walls hold very low coefficients for a range of the audible spectrum, but are not quite zero. As shown, as $Z_s$ increases and approaches infinity, then the modulus at the right of the equation approaches 1 and, thus, alpha ($\alpha$) approaches zero. Thus for the PAUT to work effectively, the examined article must be made from a material with the property of being able to transmit acoustic waves with an absorption coefficient determined by a surface impedance of the material that is conducive to ultrasonic wave propagation and therefore testing. Couplant integrity may ensure that surface impedance does not increase unnecessarily.

In one or more embodiments, a method is disclosed herein where the amplitude response is to be adjusted and calibrated using the backwall of the part being tested (test piece, examined article, or article to be examined). The amplitude response is set to be 80 percent of full screen height (FSH) and all used elements are calibrated at the specific reference level. In accordance with one or more embodiments this method may use at least two pulse transmitting-receiving elements. In other embodiments, this method may use at least two transmitting elements and at least two receiving elements. One of the transmitting-receiving elements (or one transmitting element and one receiving element) may be dedicated to the couplant channel and the second transmitting-receiving element may be dedicated to examining the article. Embodiments of this method may ensure that phased array probes are in proper contact with the inspection surface. The equipment software for controlling the process may be designed to display couplant variation during phased array examinations, such as field exams, and to alarm the operator if there is reference amplitude of the couplant less than 80% FSH.

The operational record may be stored. In addition to storing the operational record, the operational record may be reported, for example, to a notification center and may further be reported by an alert and/or an advisory to a notification center and/or one or more concerned entities (e.g., the examiner, the operator, or the technician), as desired. The report may include the FSH calibration, the couplant variation, the couplant variation tolerance range, the predetermined criterion, the time increment, the pulse shift, the material description, the ultrasonic frequency, the gain (percent of FSH), the sound field size, the sound direction, and/or the focusing. According to some embodiments, failing to satisfy the predetermined condition may indicate that a desired examination was not achieved and that further examination of the system may be desirable. In such a case, the operator may be notified to enable examination of the configuration, couplant variation tolerance range, etc., to determine whether erroneous results were obtained. This may allow the operator to run the procedure again with different inputs to obtain a more desirable output and to correct issues for future analyses.

FIG. 1 shows a phased array system 100 in accordance with one or more embodiments. In one or more embodiments, the system includes an article 102 to be examined, a sonic probe 104 for examining the article 102, a wiring harness 106, and a controller 200. Controller 200 is described below in FIG. 2 and the accompanying description. Sonic probe 104 may include both the transmitter and receiver in one probe. In other embodiments, the transmitter is separate from receiver, thus two probes, one or more transmitting probes and one or more receiving probes, may be used to perform the PAUT. Sonic probe 104 may fire sonic pulses and may record pulse reflections. Wiring harness 106 has a first connector 112 for coupling the wiring harness 106 to the sonic probe 104. Wiring harness 106 also has a second connector 114 for coupling wiring harness 106 to the controller 200. Wiring harness 106 may have any type of power and communication components that conduct electricity and/or signals. Further, wiring harness 106 may have electrical and/or signal conductors made of electrical wires such as copper and aluminum, and/or wiring harness 106 may have signal conductors such as optical fiber.

In FIG. 1 shown between the sonic probe 104 and the article 102, and within a test surface 108, a couplant 110 is placed to ensure transmission of sonic pulses out of the sonic probe 104 into the article 102. Couplant 110 may be an ultrasound-transmitting liquid forming the portion of the ultrasonic wave path in contact with the test surface 108. The article 102 to be examined made be made of a material with the property of being able to transmit acoustic waves with an absorption coefficient determined by a surface impedance of the material that is conducive to ultrasonic wave propagation and therefore testing. Materials that meet this criterion, but are not limited to, include steel, aluminum, and composites.

FIG. 1 shows an example article 102 made of two plates of steel abutted together with a butt joint, single v-groove fusion weld. The test proceeds by moving the probe within the test surface 108 of article 102. The operator of the phased array system 100 may be an examiner and the examiner may select a region of interest (an ROI 116) that may include a target area to be tested regarding a defect in the examined article 102 within the target area. The test surface 108 may or may not overlap with the ROI 116, as long as the phased array is able to reach the ROI/target area. The ROI 116 is the area from which to extract test data. FIG. 1 shows an example ROI 116 that includes a welded area 118 such as a fusion weld of a material. This welded area 118 contains a defect of the examined article 102.

Although FIG. 1 shows a butt joint, single v-groove fusion weld in ROI 116, ROI 116 may include any, all, or some part of the butt joint, single v-groove fusion weld. Furthermore, ROI 116 may include any, all, or some part of any appropriate type of inspection region of interest, such as, without limitation, a fastener such as a bolt, screw, stud, or nut; a beam, a sheet, a plate, a bar, a rod; or round, rectangular, square, or hexagonal bar stock; a fillet weld, groove weld, slot weld, spot weld, seam weld, or plug weld. In this embodiment the material is described as steel, but ROI 116 may include any appropriate type of material, such as, without limitation, aluminum, plastic, or brass. Further, although the joining method is described as fusion welding, ROI 116 may include any appropriate type of joining, such as, without limitation, a bonded joint (using chemical bonding such as a glue, an adhesive, etc.), a brazed joint, a soldered joint, an extrusion welded joint, a hot gas welded joint, and a speed tip welded joint. For example, phased array system 100 may be used on a fusion-bonded high-density polyethylene pond liner, a steel component chemically bonded to another steel component such as a hood liner to an automotive hood, or an aluminum panel adhesively bonded to an aluminum frame such as an external skin to an aircraft frame.

Figure 2:
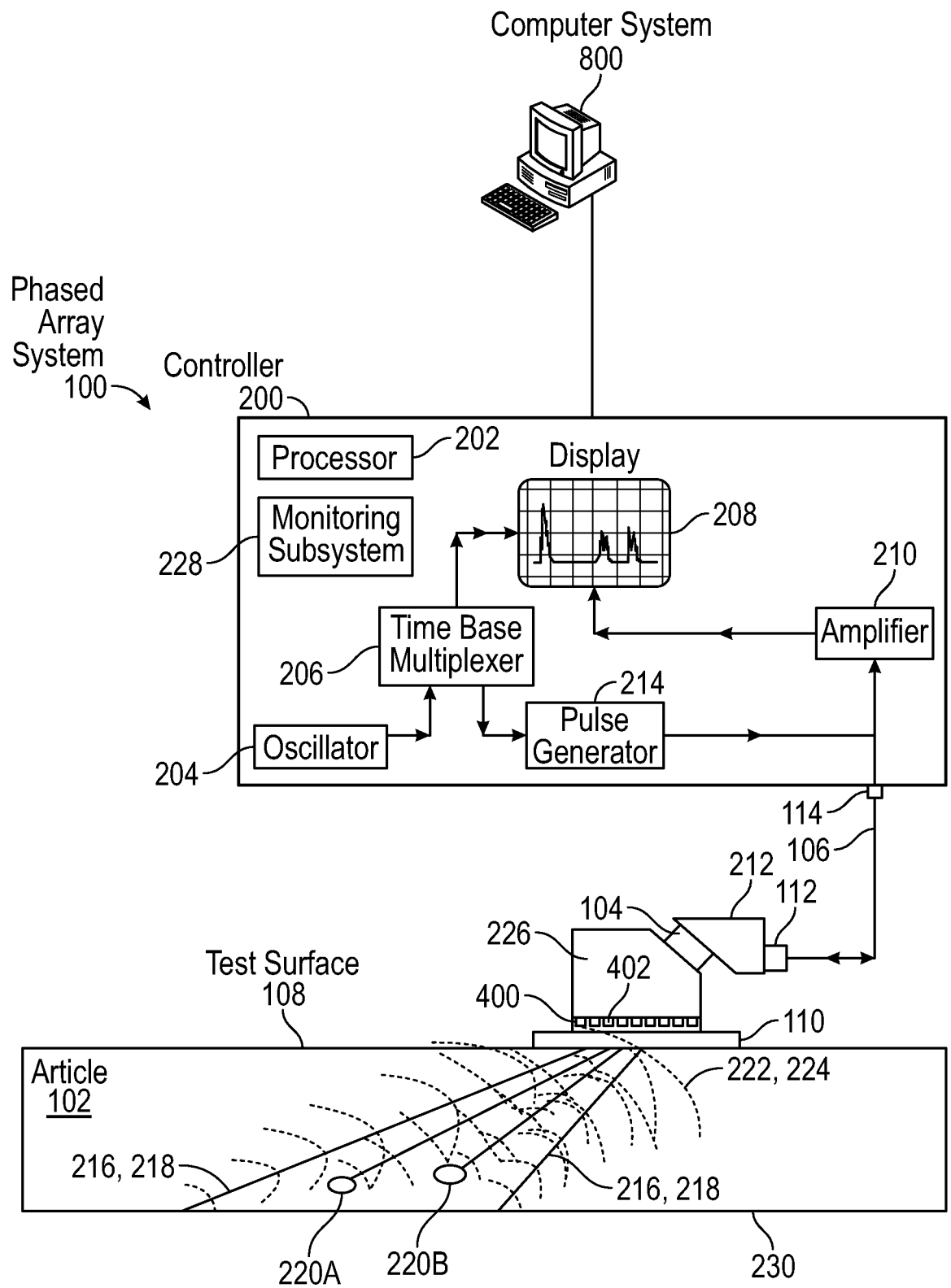

FIG. 2 shows controller 200 of phased array system 100 in more detail. The controller 200 may use a processor 202 and may have components such as an oscillator 204, a multiplexer 206, a display 208, an amplifier 210, and a pulse generator 214. Sonic probe 104 is shown with a probe shoe 226 emitting a sonic pulse 216 as part of a set of pulses such as sonic pulses group 218 on article 102. Sonic pulse 216 is shown striking a defect such as a defect 220 in two instances, defect 220A and defect 220B. Sonic pulse 216 also strikes an article backwall 230 of the article 102. A pulse reflection 222 may be generated by the defect 220 and may comprise a set of reflections. Reflections may return from the defect as a reflections group 224.

Controller 200 may include a monitoring subsystem 228. The processor 202 coupled to the controller 200 monitors the couplant channel (electronic pathway for monitoring the integrity of the couplant) to determine couplant variation by comparing couplant channel operational parameters with a predetermined criterion. An example of the operational parameter may be FSH, and an example of the predetermined criterion may be 80% of FSH. The processor compares the couplant variation with the predetermined criterion such as a couplant variation range. In this manner, the controller 200 determines couplant variation and thus the integrity of the couplant by comparing the set of operational parameters of the couplant channel and the predetermined criterion. The criterion may include a criterion of a set of criteria for acceptance or rejection of the couplant integrity of the couplant channel. The predetermined criterion may be, for example, couplant integrity, such as FSH, failing to satisfy the couplant integrity predetermined criterion, such as 80% of FSH. In some embodiments the system identifies any couplant variation and may report an alert such as "couplant variation not acceptable" before, when, or after the FSH falls below 80% during scanning.

In one or more embodiments, the controller 200 is configured to receive a command and then use the processor 202 to perform a set of instructions that includes having the oscillator 204 send pulses of electricity through the multiplexer 206 to the pulse generator 214, then through the wiring harness 106. Wiring harness 106 is shown connected and coupled to the sonic probe through the first connector 112 and connected and coupled to the controller 200 through the second connector 114. The wiring harness 106 is also shown coupled to a communication interface 212. The sonic probe 104 contains the array of piezoelectric crystals. Each piezoelectric crystal embedded in the ultrasonic probe vibrates at a very high (ultrasonic) frequency such as between 1 MHz (megahertz) and 15 MHz. Ultrasonic probes used for fusion weld examination may have frequencies generally between 2 MHz and 5 Mhz. The lower frequency probes may be used for the examination of coarse-grained material or on rough surfaces. Higher frequency probes may be used for the detection of fine defects such as cracks or lack of fusion.

The ultrasonic vibrations are transmitted into the material to be tested using the couplant 110 such as water or a gel, paste, oil, grease, adhesive, and others. Couplant 110 helps ensure transmission of the sonic pulse 216 into article 102. The couplant 110 is so named because couplant 110 couples the sonic probe 104 to the test surface 108. Coupling is therefore facilitated by couplant 110. The couplant 110 is in between and directly in contact with the sonic probe 104 and the test surface 108. Reliability of the exam may be improved by the integrity of couplant 110 and the condition of the test surface 108. For example, the better the surface finish at the test surface 108 of article 102 then the more reliable may be the coupling of the sonic probe 104 to the test surface 108, the more revealing is the examination, and therefore the higher the reliability of the exam.

Staying with FIG. 2, in the material of article 102, the sonic pulse 216 travels in a predictable path as a beam of sonic pulses group 218 until each sonic pulse 216 encounters a discontinuity such as defect 220A and/or defect 220B or article backwall 230 when some, most, or all of the sound hitting the defect or the backwall is reflected. Depending on the angle at which the beam strikes the obstruction some or all of the sound beam of sonic pulse 216 will be reflected back to the pulse transmitting-receiving elements 400 (FIG. 4) in the probe. Pulse transmitting-receiving elements 400 are described below in FIG. 4 and the accompanying description. The pulse reflection 222 vibrates the piezoelectric crystal of piezoelectric oscillators 402 thus generating an electrical signal which is then transmitted back through the communication interface 212 and the wiring harness 106 to controller 200, then through amplifier 210 and display 208. In this manner the sonic probe 104 is able to record pulse reflections of the sonic pulses reflected off of defects and/or backwalls, edges, and ends.

In FIG. 2, the controller 200 may include a computer system similar to the computer system 800 described below in FIG. 8 and the accompanying description. In particular, the controller 200 may be a ruggedized computer system with functionality to withstand vibrations, extreme temperatures, wet conditions, and/or dusty conditions, for example, around a manufacturing environment, a field location of a pipeline installation, or around an onshore or offshore drilling rig.

Figure 3:
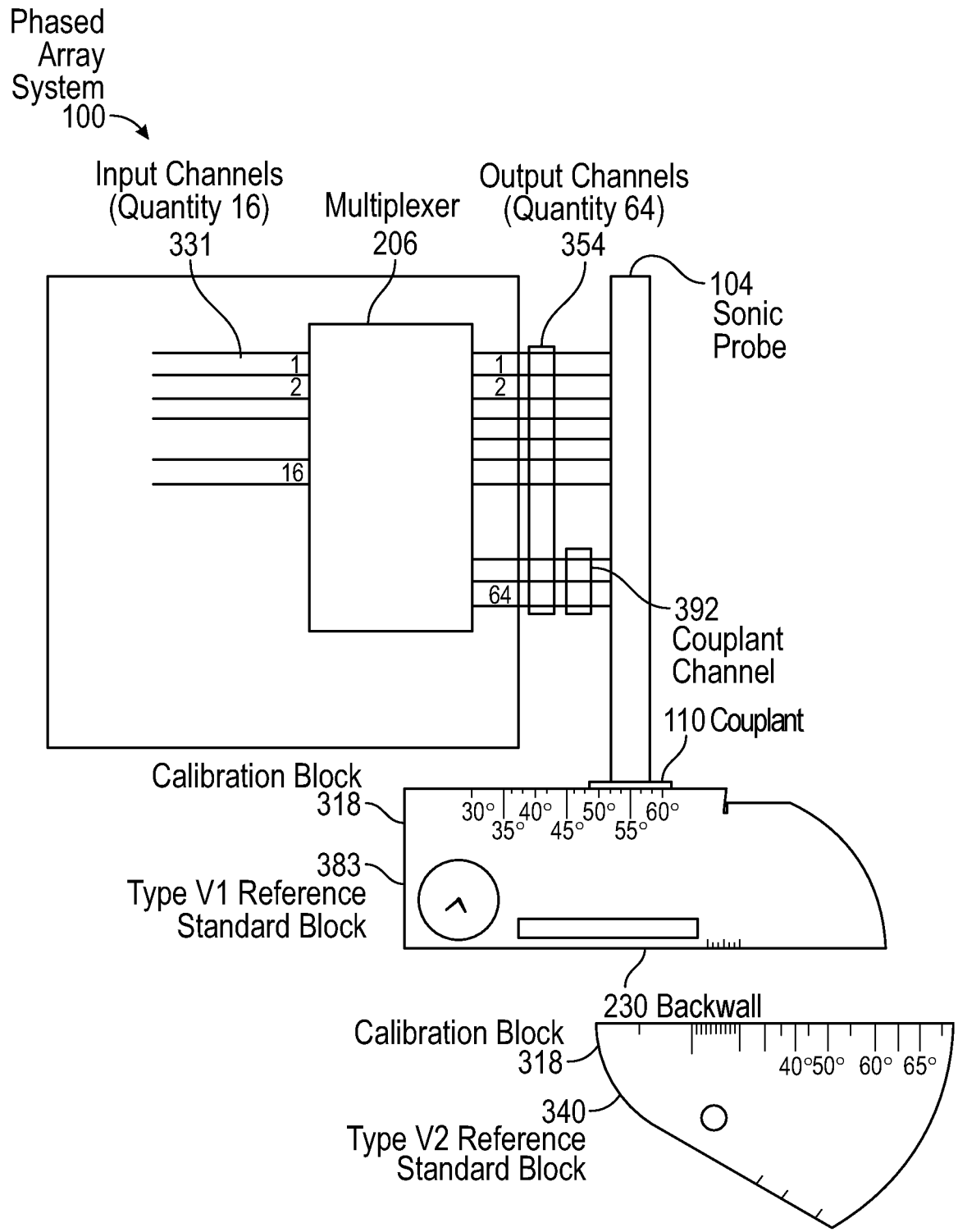

FIG. 3 shows a schematic of an exemplary ultrasonic phased array instrument such as phased array system 100. This figure shows input channels 331 and that a subset of the channels may be dedicated as a couplant channel 392 for monitoring the couplant 110 variation. In this example the maximum number of transmitting and/or receiving channels which can be used for one pulse, i.e., that can be simultaneously activated, is equal to the number of channels in the phased array instrument. The schematic features a maximum number of channels that can be simultaneously activated that is smaller than the number of channels in the ultrasonic phased array instrument and which are controlled by an internal multiplexing device, the multiplexer 206. For example, in a type 16/64 multiplexed ultrasonic phased array instrument, the maximum number of channels that can be simultaneously activated is 16 (input channels 331) and the total number of channels available is 64 (output channels 354).

FIG. 3 also shows the sonic probe 104 coupled to a calibration block 318. Couplant 110 may be disposed between sonic probe 104 and calibration block 318. A number of standard calibration blocks are available with the shape and dimensions being specified in international standards such as ISO 2400, ISO 7963, ASME V, and ASTM E164. Calibration block 318 may be a V2 calibration block (a type V2 reference standard block 340) or a V1 calibration block (a type V1 reference standard block 383). Calibration of a compression wave probe is done using calibration block 318, specifically the type V1 reference standard block 383. In accordance with one or more embodiments calibration includes having the sonic probe 104 fire a compression straight beam at a zero incident angle and adjusting the amplitude response using a reference backwall 360. The amplitude response may also be adjusted using the article backwall 230 of the article 102. Amplitude response calibration is set to 80% of FSH.

Figure 4B:
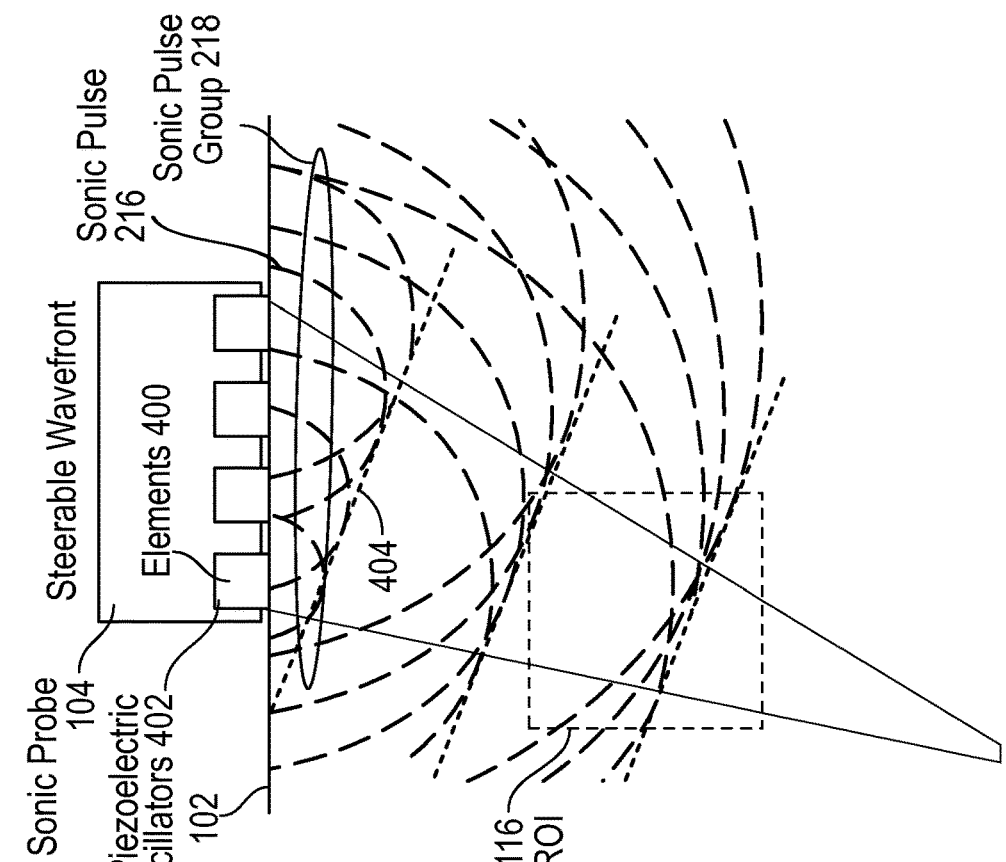
Figure 4A:
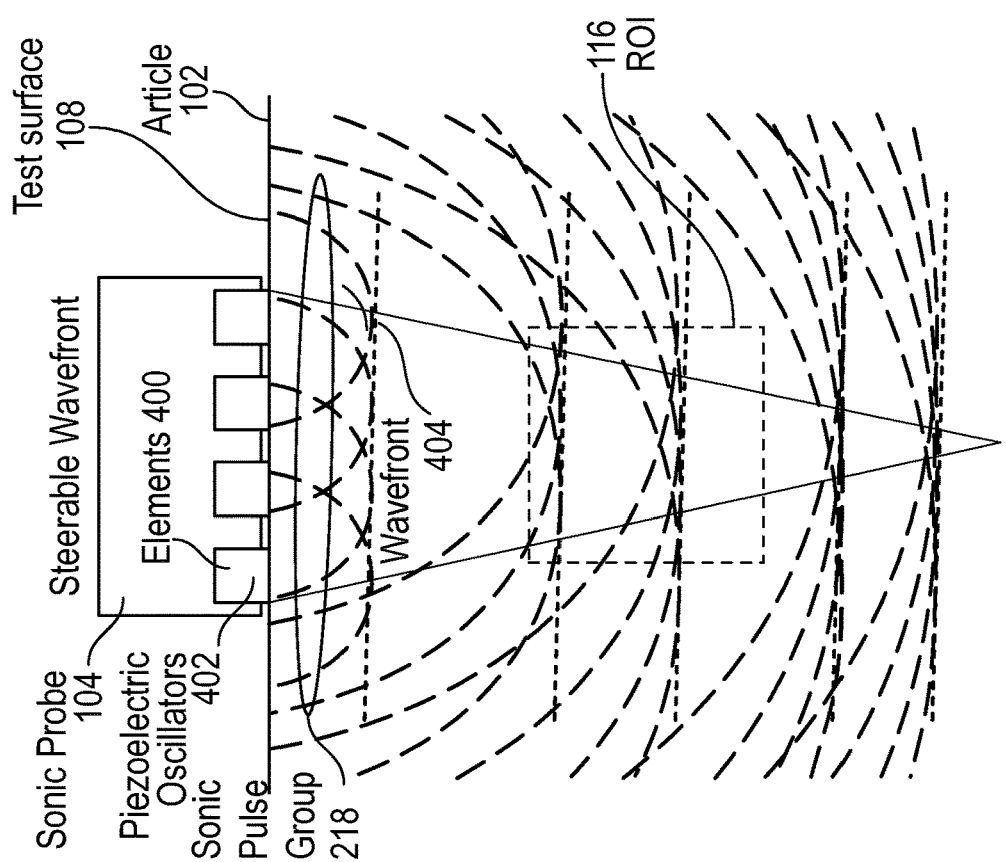

FIG. 4A and FIG. 4B show sonic probe 104 emitting the sonic pulses group 218 and transmitting the sonic pulses group 218 into article 102 in accordance with one or more embodiments. PAUT data may disclose a discontinuity within the ROI 116. A discontinuity may be defined as an irregularity suspected of being a flaw such as defect 220 in article 102. The discontinuity may be identified for diagnosing the defect. Upon disclosure of a discontinuity the operator such as the examiner or a technician may be notified to enable examination of the discontinuity to evaluate it and its location to make a diagnosis and therefore a determination of whether there is a flaw substantial enough to affect the purpose of the examined article. In this manner, the term discontinuity may be used prior to the determination that the irregularity falls outside an acceptance criterion or two or more of the acceptance criteria. Likewise, operating parameters of the couplant such as the presence, condition, and variation of the couplant may be evaluated to determine whether they fall outside an acceptance criterion or two or more of the acceptance criteria. Examples of discontinuities include defects and flaws such as internal flaws. Flaws may be material separations, inclusion, lack of side wall fusion (LOSWF—weld material does not fuse with the parent plate), lack of inter-run fusion (LOIRF—weld material does not adequately penetrate the previous weld bead), fractures, cracks, pores, blisters, blowholes, voids, duplications, segregations, inclusions, slag lines and double slag lines, inhomogeneities, and wall thickness variations.

FIG. 4A and FIG. 4B show scanning with a phased array probe such as sonic probe 104. Specifically, FIG. 4A shows perpendicular scanning, while FIG. 4B shows scanning at an angle by delayed actuation of the elements. FIG. 4A and FIG. 4B show a plurality of pulse transmitting-receiving elements 400 within the sonic probe 104. A phased array probe such as sonic probe 104 may contain, for example, 16 to 256 of the oscillator elements. Oscillator elements may be made from piezoelectric crystals and thus piezoelectric crystal oscillators may be known as piezoelectric oscillators 402. These oscillator elements can send and receive sound pulses independently of each other at the same or different times. FIG. 4A and FIG. 4B show the piezoelectric oscillators 402 within the sonic probe 104 emitting or firing the sonic pulses group 218 thereby illustrating a steerable wavefront 404. The pulse transmitting-receiving elements 400 may emit the sonic pulse 216 at an ultrasonic frequency into the article 102. Piezoelectric oscillators 402 may be arranged as a line array, as a two-dimensional matrix, as a ring array, or in a complex arbitrary shape. By interconnecting several of the piezoelectric oscillators 402, virtual probes are created. Virtual probes then behave like a single oscillator with the corresponding properties of sound field size, sound direction, and focusing. By electronically activating or controlling (pulse shifting) these individual elements, steerable wavefront 404 is generated. The pulse shift forms the steerable wavefront 404. The steerable wavefront 404 may then be guided through the material. In this manner, the ROI 116 may be examined by the steerable wavefront 404 transmitted from sonic probe 104 at the test surface 108 without requiring sonic probe 104 to be directly over the ROI 116; i.e., the steerable wavefront 404 is guided to the ROI 116.

FIG. 5A, FIG. 5B and FIG. 5C show an example phased array system 100 in accordance with one or more embodiments. As shown in FIG. 5A and FIG. 5B, sonic probe 104 is illustrated on test surface 108 of article 102. Couplant 110 is located between sonic probe 104 and test surface 108. Couplant channel 392 is illustrated as a compression straight beam 502 at a zero incident angle to test surface 108. FIG. 5A shows a half-skip reflection 504 and a full-skip reflection 506 along with compression straight beam 502. FIG. 5A shows the sonic pulses group 218 that echo off of the article backwall 230 of the article 102. The pulses continue to echo off of any surface or defect until the pulse energy dissipates. As such, a pulse may echo more than one time. As the pulse echoes, it is said to skip. Full-skip reflection 506 is the distance traveled when the sonic pulse 216 has traveled down, hit the bottom, then traveled up to the surface. Half-skip reflection 504 is when the angle beam has traveled down. FIG. 5B also shows ROI 116 and a defect 220. The phased array system 100 may alarm if or when the integrity status of the couplant variation, such as FSH as described in FIG. 3, fails to satisfy the predetermined criterion such as 80% FSH. The alarm may be such as shown in FIG. 5B, having a low indicator 508 and a high indicator 510.

FIG. 5C shows a table with example values for defects and responses. The data of FIG. 5C shows that when given the same defect or defects, such as an induced defect simulating actual defects, different responses may be generated due to variances in the integrity of the coupling. As such, the acceptance and rejection of defects may vary with respect to variation of couplant integrity and therefore may impact reliability of the exam. FSH is the full screen height of the display of a flaw detector. Percent of FSH (% FSH) is a relative indication of the peak, or amplitude, of the signal. The signal may be an echo received by the sonic probe. Given a known peak such as from a reference reflector, the peak height may be adjusted to be FSH or, more often, some value below FSH. The peak height setting value is named as a percentage of FSH (% FSH) such as 80% FSH. Percent of FSH may be considered a form of sensitivity adjustment. Echoes may then be compared to the reference reflector by comparing the % FSH of the echo with the % FSH of the reference. PAUT inspection requires that the sonic probe used for the inspection remains in proper contact with test surface of the article being inspected and/or the reference block on which the sonic probe is calibrated. Proper contact may ensure reliable inspection results or may improve the reliability of inspection results. In some embodiments longitudinal ultrasonic waves may be fired using the same sonic probe being used for the PAUT inspection. In some embodiments one or more ultrasonic waves may be used to detect any improper surface condition and/or loss of couplant during inspection. FIG. 5C illustrates an example of an experiment performed on three defects by scanning each defect three times by half skip and three times by full skip. Each Scan of the same defect gave a different FSH due to variations of couplant. In the absence of careful couplant integrity monitoring, variations in the amplitude (% FSH) may result in test results that miss finding defects or results that find discontinuities that are mistaken for defects.

As shown in FIG. 2 and in FIGS. 5A and 5B, the sonic probe 104 may include the probe shoe 226. Sonic probe 104 may send signals through probe shoe 226, also known in the art as a wedge. The probe shoe 226 material may include a transparent thermoplastic such as poly methyl methacrylate (PMMA). PMMA may be found in materials commercially available as of the priority date of this patent application and include, for example, Plexiglas® and Perspex®. This list is not intended to be limiting, nor are the determinations intended to be limited to the commercially available materials. Any suitable material (e.g., custom-blended materials) providing similar functionality to that described may also be implemented without departing from the scope of the present disclosure. Probe shoe 226 may have an angle on which the sonic probe 104 may be mounted, thus giving the probe shoe 226 is characteristic name wedge. The wedge may have a probe side and a test side. The test side of the probe shoe 226 contacts the test surface 108 of the article 102. Probe shoe 226 may have a flat parallel surface arranged to be parallel to the surface of the article. The probe shoe 226 surface may be contoured with a shape (such as a concave contour) to fit the test surface of the article. Sonic probe 104 may have a wear surface and/or may have the probe shoe 226. The ultrasonic pulses travel through the wear surface and/or the probe shoe 226, and therefore require time to do so. The thickness, speed of sound in the material (material constant), and other features of the wear surface and/or probe shoe 226 determine the duration of travel time for the sonic pulse 216 and/or the sonic pulses group 218. This duration of time is known in the art as the probe delay, p-delay, or wedge delay. Wedge delay may be set out as part of the calibration of phased array system 100.

Figure 6:
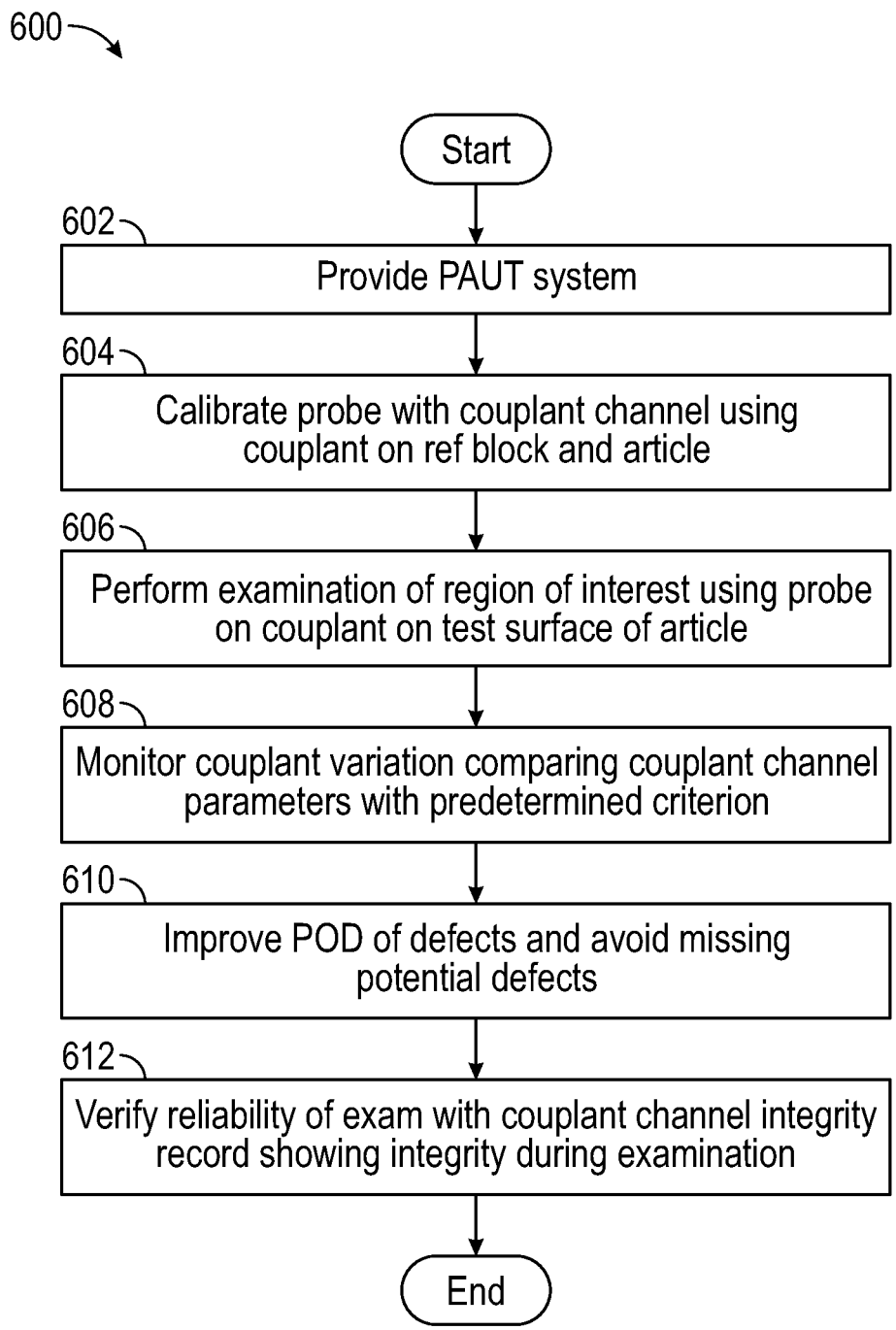
FIGS. 6 and 7 show flowcharts in accordance with one or more embodiments.
Figure 7:
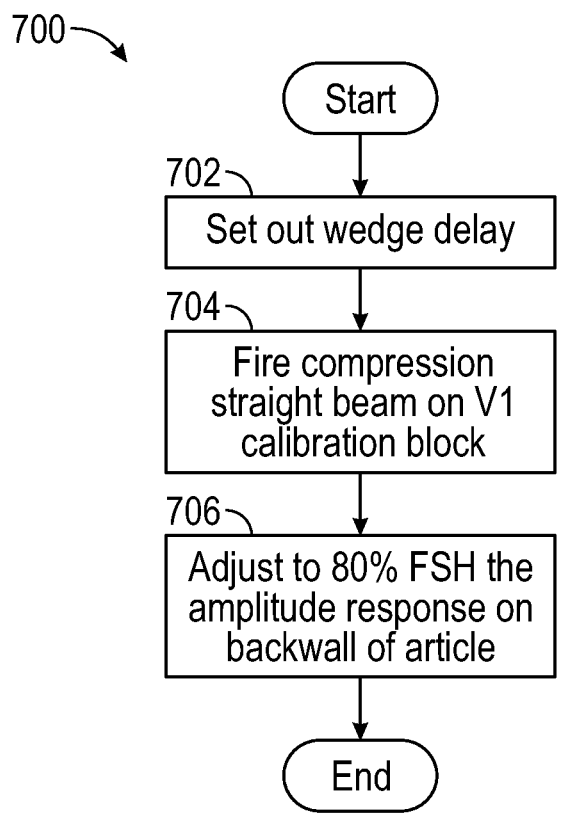

FIG. 6 and FIG. 7 depict flowcharts of methods in accordance with one or more embodiments. Further, one or more steps in FIG. 6 and FIG. 7 may be performed by one or more components as described in FIGS. 1-5 (e.g., the phased array system 100). While the various steps in FIG. 6 and FIG. 7 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

FIG. 6 illustrates a method (a reliability method 600) for performing a phased array ultrasonic testing (PAUT) examination on an article, such as article 102. Referring to FIGS. 1-5 together, initially the phased array system 100 is provided (step 602). Next, couplant channel 392 may be calibrated to a predetermined criterion and/or a set of criteria using calibration block 318 (step 604). The couplant 110 is placed on the article 102 (i.e., the test piece or examined article) and the sonic probe 104 is placed on the couplant 110. The sonic probe 104 and the couplant 110 may be positioned within a test surface 108. Test surface 108 may cooperate with sonic probe 104 and the specific configuration of sonic probe 104 such that ROI 116 may be examined from within test surface 108. The test surface 108, the couplant 110, the operational parameters of couplant 110, and the specific configurations of phased array system 100 and of sonic probe 104 may cooperate to meet an examination criterion of a set of exam criteria for the ROI 116. At this stage, an operator may command the system to perform an examination (step 606).

As the examination of the article progresses, the phased array system 100 may monitor the operational parameters of the couplant 110 by monitoring the couplant 110 variation by monitoring the couplant channel 392. Specifically, the monitoring subsystem of phased array system 100 may use the controller 200 to monitor the couplant channel to determine couplant variation by comparing couplant channel operational parameters with the predetermined criterion. The processor 202 compares the couplant variation with the predetermined criterion such as a couplant variation range. Phased array system 100 may report the results of the couplant channel 392 monitoring. In this manner the controller 200 determines couplant variation and thus the integrity of the couplant by comparing the set of operational parameters of the couplant channel and the predetermined criterion (step 608). The examination of the article continues by detecting defect 220 or other flaws, discontinuities, obstructions, or irregularities. Some or all of the terms "defect." "discontinuity." "flaw", "irregularity," "obstruction," and other appropriate terminology may be used interchangeably as appropriate without departing from the scope of this disclosure. By continuously monitoring the couplant 110 variation, the examination using phased array system 100 may improve the POD of defects and avoid missing potential defects such as defect 220 (step 610). In step 612, the reliability of the examination is verified. The continuous monitoring of the couplant channel integrity may provide an operational record showing that the couplant integrity remained within or did not remain within the predetermined criteria thereby assuring reliability of the examination. The operational record thus verifies the reliability of the examination. In the case of the operational record showing that the couplant integrity did not remain within the predetermined criteria, the couplant channel monitoring may affirm the lack of reliability of the examination.

FIG. 7 illustrates a method (a calibration method 700) for calibrating a couplant channel for performing a PAUT examination on article 102 using a phased array system 100. Thus, FIG. 7 expands on step 604 of FIG. 6 above. Referring to FIGS. 1-6 together, initially the wedge delay is set out (a wedge delay step 702). The calibration continues by firing a compression straight beam on calibration block 318 such as the type V1 reference standard block 383 (a fire beam step 704). The phased array system 100 configuration is adjusted to set the amplitude response against the backwall of the article to 80-percent of FSH (an amplitude step 706).

Figure 8:
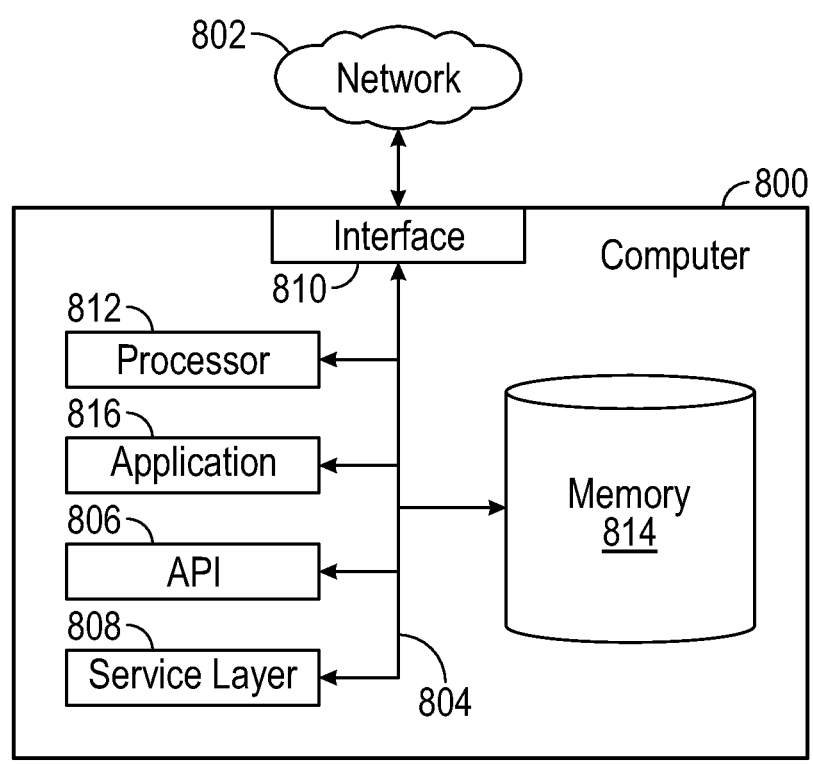
FIG. 8 shows a computer system in accordance with one or more embodiments.

FIG. 8 shows a computer system in accordance with one or more embodiments. In some embodiments, a user device may provide a graphical user interface for communicating with phased array system 100 to monitor the PAUT examination. For example, a user device may be a personal computer, a human-machine interface, a smartphone, or another type of computer device for presenting information and obtaining user inputs regarding the presented information. Likewise, the user device may obtain various user selections regarding PAUT operations, couplant variation, operational parameters of the couplant channel, etc. Likewise, the user device may display various reports that may include charts as well as other arrangements of PAUT data.

Embodiments may be implemented on a computer system. FIG. 8 is a block diagram of a computer system (800) used to provide computational functionalities associated with described algorithms, methods, functions, processes, flows, and procedures as described in the instant disclosure, according to an implementation. The computer system (800) illustrated in FIG. 8 is intended to encompass any computing device such as a high-performance computing device, a server, desktop computer, laptop/notebook computer, wireless data port, smart phone, personal data assistant, tablet computing device, one or more processors within these devices, or any other suitable processing device, including both physical or virtual instances (or both) of the computing device. Additionally, the computer system (800) may include a computer that includes an input device, such as a keypad, keyboard, touch screen, or other device that can accept user information, and an output device that conveys information associated with the operation of the computer system (800), including digital data, visual, or audio information (or a combination of information), or a graphical user interface.

The computer system (800) can serve in a role as a client, network component, a server, a database or other persistency, or any other component (or a combination of roles) of a computer system for performing the subject matter described in the instant disclosure. Computer system (800) is communicably coupled with a network 802 or cloud. In some implementations, one or more components of the computer system (800) may be configured to operate within environments, including cloud-computing-based, local, global, or other environment (or a combination of environments).

At a high level, the computer system (800) is an electronic computing device operable to receive, transmit, process, store, or manage data and information associated with the described subject matter. According to some implementations, the computer system (800) may also include or be communicably coupled with an application server, e-mail server, web server, caching server, streaming data server, business intelligence server, or other server or a combination of servers.

The computer system (800) can receive requests over network 802 or cloud from a client application (for example, executing on another computer system 800) and responding to the received requests by processing the said requests in an appropriate software application. In addition, requests may also be sent to the computer system (800) from internal users (for example, from a command console or by other appropriate access method), external or third-parties, other automated applications, as well as any other appropriate entities, individuals, systems, or computers.

Each of the components of the computer system (800) can communicate using a system bus (804). In some implementations, any or all of the components of the computer system (800), both hardware or software (or a combination of hardware and software), may interface with each other or the interface (810) (or a combination of both) over the system bus (804) using an application programming interface (API 806) or a service layer (808) (or a combination of the API (806) and service layer (808). The API (806) may include specifications for routines, data structures, and object classes. The API (806) may be either computer-language independent or dependent and refer to a complete interface, a single function, or even a set of APIs. The service layer (808) provides software services to the computer system (800) or other components (whether or not illustrated) that are communicably coupled to the computer system (800). The functionality of the computer system (800) may be accessible for all service consumers using this service layer. Software services, such as those provided by the service layer (808), provide reusable, defined business functionalities through a defined interface. For example, the interface may be software written in JAVA, C++, or other suitable language providing data in extensible markup language (XML) format or other suitable format. While illustrated as an integrated component of the computer system (800), alternative implementations may illustrate the API (806) or the service layer (808) as stand-alone components in relation to other components of the computer system (800) or other components (whether or not illustrated) that are communicably coupled to the computer system (800). Moreover, any or all parts of the API (806) or the service layer (808) may be implemented as child or sub-modules of another software module, enterprise application, or hardware module without departing from the scope of this disclosure.

The computer system (800) includes an interface (810). Although illustrated as a single one of the interface (810) in FIG. 8, two or more of the interface (810) may be used according to particular needs, desires, or particular implementations of the computer system (800). The interface (810) is used by the computer system (800) for communicating with other systems in a distributed environment, some or all of which are connected to the network 802. Generally, the interface 810 includes logic encoded in software or hardware (or a combination of software and hardware) and operable to communicate with the network 802 or cloud. More specifically, the interface (810) may include software supporting one or more communication protocols associated with communications such that the network 802 or interface's hardware is operable to communicate physical signals within and outside of computer system (800).

Computer system (800) includes at least one of a computer processor (812). Although illustrated as a single one of computer processor (812) in FIG. 8, two or more processors may be used according to particular needs, desires, or particular implementations of the computer system (800). Computer processor (812) executes instructions and manipulates data to perform the operations of the computer system (800) and any algorithms, methods, functions, processes, flows, and procedures as described in the instant disclosure.

The computer system (800) also includes a memory (814) that holds data for the computer system (800) or other components (or a combination of both) that can be connected to the network 802. For example, memory (814) may be a database storing data consistent with this disclosure. Although illustrated as a single one of memory (814) in FIG. 8, two or more memories may be used according to particular needs, desires, or particular implementations of the computer system (800) and the described functionality. Although memory (814) is illustrated as an integral component of the computer system (800), in alternative implementations, memory (814) may be external to the computer system (800).

The application (816) is an algorithmic software engine providing functionality according to particular needs, desires, or particular implementations of the computer system (800), particularly with respect to functionality described in this disclosure. For example, application (816) can serve as one or more components, modules, applications, etc. Further, although illustrated as a single one of application (816), the application (816) may be implemented as a multiple quantity of application (816) on the computer system (800). In addition, although illustrated as integral to the computer system (800), in alternative implementations, the application (816) may be external to the computer system (800).

There may be any number of computer system (800) associated with, or external to, a computer system containing computer system (800), wherein each computer system (800) communicates over network 802. Further, the term "client," "user," and other appropriate terminology may be used interchangeably as appropriate without departing from the scope of this disclosure. Moreover, this disclosure contemplates that many users may use one of computer system (800), or that one user may use multiple computers of computer system (800).

In some embodiments, the computer system (800) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, a cloud computing system may operate according to one or more service models, such as infrastructure as a service (IaaS), platform as a service (PaaS), software as a service (SaaS), mobile "backend" as a service (MBaaS), artificial intelligence as a service (AIaaS), serverless computing, and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A system for detecting, in an examination, at least one defect in a target area of an article, the system comprising:
    a controller comprising a processor, an oscillator, a display, and an amplifier and configured to generate sonic pulses and receive pulse reflections;
    a wiring harness configured to transmit the sonic pulses and the pulse reflections;
    a sonic probe configured with an array of at least two pulse transmitting-receiving elements, the sonic probe being configured to fire the sonic pulses,
    wherein the wiring harness operatively connects the sonic probe with the controller; and
    a couplant disposed between the sonic probe and a test surface of the article and configured to conduct the sonic pulses between the sonic probe and the article,
    wherein the at least one defect in the target area of the article is detected by the sonic pulses, transmitted by the sonic probe into the target area, reflected off of the at least one defect, returned to the sonic probe, received by the pulse transmitting-receiving elements, and transmitted to the controller.

2. The system of claim 1, wherein the sonic probe is configured to record: the pulse reflections of the sonic pulses reflected off the at least one defect and the pulse reflections of the sonic pulses reflected off of a backwall.

3. The system of claim 1 wherein the sonic probe is configured to transmit, through the wiring harness, the pulse reflections to the controller.

4. The system of claim 1 wherein the at least two pulse transmitting-receiving elements comprise piezoelectric crystal oscillators.

5. The system of claim 1 wherein the sonic pulses comprise an ultrasonic frequency.

6. The system of claim 1 wherein the article comprises steel.

7. The system of claim 1 wherein the target area comprises a welded area of the article.

8. The system of claim 1 wherein the at least one defect comprises a weld flaw in the target area.

9. The system of claim 1 wherein the sonic pulses comprise a set of pulses.

10. The system of claim 9 wherein the firing of the set of pulses is phased by a time increment of a pulse shift to form a steerable wavefront.

11. The system of claim 1 wherein the sonic probe comprises a couplant channel for at least one of the at least two pulse transmitting-receiving elements in the array.

12. The system of claim 11 wherein the couplant channel is configured as a compression straight beam and arranged at a zero incident angle to the test surface of the article,
the couplant channel is calibrated to a predetermined criterion using a calibration block,
the controller is configured to display a couplant variation before, during, or after the examination, and
the controller alarms an operator in response to determining that the couplant variation fails to satisfy the predetermined criterion.

13. The system of claim 12 wherein the calibration block comprises a type V1 reference standard block and the predetermined criterion is a reference amplitude.

14. The system of claim 1 wherein the wiring harness comprises:
a first connector configured to couple the sonic probe to the wiring harness,
a second connector configured to couple the controller to the wiring harness, and
a communication interface coupled to the wiring harness.

15. A method, comprising:
examining, by performing a phased array examination using a phased array system, an article with a target area to be tested for at least one defect in the target area of the article;
disposing a couplant on a test surface of the article;
disposing a sonic probe on the couplant;
commanding the phased array system to examine the article;
detecting the at least one defect using the phased array system; and
evaluating the defect and a defect location, diagnosing the defect, and determining an affect on a purpose of the article on the detection of the at least one defect.

16. The method of claim 15 further comprising:
establishing a couplant channel in the phased array system to monitor a couplant variation during the examining;
developing, using the sonic probe, the couplant channel; and
calibrating, using the sonic probe, the couplant channel to a predetermined criterion using a calibration block.

17. The method of claim 16 further comprising:
monitoring, using the phased array system, the couplant variation;
displaying, using a controller, the couplant variation;
comparing, using a processor of the phased array system, the couplant variation with the predetermined criterion;
reporting a result of the comparing; and
alarming an operator in response to determining that the couplant variation fails to satisfy the predetermined criterion.

18. The method of claim 16, further comprising:
configuring the couplant channel as a compression straight beam and arranging the sonic probe at a zero incident angle to the test surface of the article.

19. The method of claim 16, wherein:
calibrating the couplant channel to the predetermined criterion comprises setting out a wedge delay, firing a compression straight beam on a V1 calibration block, adjusting an amplitude response on a backwall of the article, and adjusting the amplitude response to the predetermined criterion.

20. The method of claim 19, wherein:
the predetermined criterion comprises adjusting the amplitude response to 80% of a full screen height.

* * * * *